United States Patent [19]

Narishige et al.

[11] Patent Number: 5,051,856

[45] Date of Patent: Sep. 24, 1991

[54] THIN FILM MAGNETIC HEAD WITH MIXED CRYSTAL STRUCTURES

[75] Inventors: Shinji Narishige, Mito; Katsuya Mitsuoka, Hitachi; Takao Imagawa, Sendai; Kouichi Nishioka, Hitachi; Akira Kumagai, Hitachi; Masaaki Sano, Hitachi; Yutaka Sugita, Hitachi; Reiko Arai, Mito; Tetsuo Kobayashi, Kanagawa; Toshihiro Yoshida, Odawara; Yokuo Saitoh, Kanagawa; Yoshikazu Tsuji, Kanagawa; Masaaki Hayashi, Odawara, all of Japan

[73] Assignee: Hitachi, Ltd., Tokyo, Japan

[21] Appl. No.: 420,478

[22] Filed: Oct. 12, 1989

[30] Foreign Application Priority Data

Oct. 14, 1988 [JP] Japan ............................. 63-257199
May 17, 1989 [JP] Japan ............................. 1-121549

[51] Int. Cl.$^5$ ............................................. C11B 5/147
[52] U.S. Cl. ................................................. 360/126
[58] Field of Search ........................ 360/125, 126, 127

[56] References Cited

U.S. PATENT DOCUMENTS 4,242,710 12/1980 Hempstead et al. ................ 360/126
4,780,781 10/1988 Sano et al. ......................... 360/126
4,858,049 8/1989 Kobayashi et al. ................. 360/126
4,918,555 4/1990 Yoshizawa et al. ................. 360/126

FOREIGN PATENT DOCUMENTS 2605615 2/1976 Fed. Rep. of Germany ...... 360/126

OTHER PUBLICATIONS

Hanazono et al., "Design and Fabrication of Thin-Film Heads Based on a Dry Process", J. Appl. Phys., Apr. 15, 1987, No. 61, pp. 4157-4162.
Collins et al., "The Magnetic Properties of R.F.-Sputtered Permalloy and Mumetal Films", Thin Solid Films, 1981, No. 86, pp. 165-174.
Potzlberger, "Magnetron Sputtering of Permalloy for Thin-Film Heads", IEEE Trans. on Magnetics, Sep. 1984, MAG. 20, No. 5, pp. 851-853.
Jhingan, "Effect of Nitrogen on the Crystal Structure of Sputtered Ni-Fe Films", J. Appl. Phys., Apr. 15, 1985, No. 57, pp. 3991-3993.
Lo et al., "Magnetic and Structural Properties of High Rate Dual Ion-Beam Sputtered Ni Fe Films", J. Applied Phys., Apr. 15, 1987, No. 61, pp. 3520-3525.
Bozorth, "Iron Nickel Alloys", Ferromagnetism-D. van Nostrand Com., Inc., 1951, pp. 114-144.
Fujii et al., "Random Anisotrophy of Crystallites in Thin Permalloy Films", IEEE Trans. on Magnetics, Sep. 1970, MAG 6, No. 3, pp. 619-624.
Bozorth, "Magnetic Crystal Anisotrophy and Magnetostriction of Iron-Nickel Alloys", Physical Review, Feb. 1, 1953, vol. 89, No. 3, pp. 624-628.

Primary Examiner—David J. Severin
Attorney, Agent, or Firm—Antonelli, Terry, Stout & Kraus

[57] ABSTRACT

A thin film magnetic head has magnetic films, at least one of which is composed of a material containing major components of nickel and iron and one or more element from nitrogen, oxygen and carbon and has two of face-centered cubic system and body-centered tetragonal system, whereby thin film magnetic heads having a high permeability and low coercive force can be provided.

13 Claims, 3 Drawing Sheets

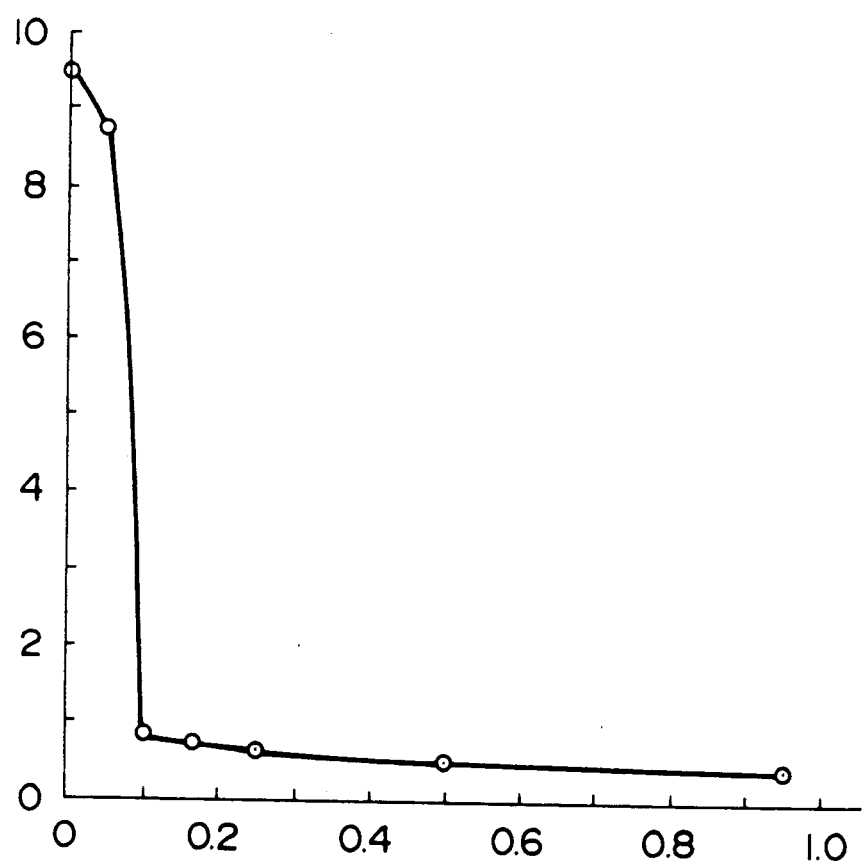
F I G. 3

THIN FILM MAGNETIC HEAD WITH MIXED CRYSTAL STRUCTURES

BACKGROUND OF THE INVENTION

1. Field of the Invention

The present invention relates to a magnetic recording device, and more particularly, to a thin film magnetic head suitable for use in a magnetic disk device.

2. Description of the Prior Art

A recording density of the magnetic recording devices has been remarkably increased and still intensively contrived to further increase by many workers in various fields. The recording density has been increasing in a rate of becoming about twice in 2.5 to 3 years and plays an important role in the external storage devices for the information retrieval society. An important part which is essential to the increase the recording density of magnetic disk devices is a thin film magnetic head. Comparing with ferrite type bulk magnetic heads which have been employed for the magnetic heads in the magnetic disk devices over the years, the thin film magnetic heads can easily be provided with narrow channelings and are capable of exhibiting a high ratio of signal to noise (S/N) in the high-frequency range of several megahertz to several tens megahertz. Therefore, further development of the thin film magnetic heads has been increasingly demanded.

Recording and reproducing properties of the thin film magnetic heads depend extensively on magnetic properties of the magnetic films. For the thin film magnetic heads to be used in the high frequency range, they must have a higher permeability than that of ordinary magnetic films in the high frequency range. As an example of the magnetic films having a high permeability in the high frequency range, permalloy which is an alloy of nickel and iron has been known. Permalloy thin films have been employed as magnetic films in the thin film magnetic heads as has been well known in the art. There have been known two main techniques, i.e., plating process and sputtering process for producing the permalloy thin film for use in the thin film magnetic heads. On the other hand, an instability of reproducing output of the thin film magnetic heads is attributed to the magnetic films having a non-uniform distribution of the composition thereof and a varying composition owing to compositional variation from lot to lot in the production of the magnetic films. It has been evident that the sputtering process which can provide a uniform composition throughout the magnetic films and a good reproducibility in composition to every lot in the process is superior and advantageous in commercial production as compared with the plating process.

PROBLEMS TO BE SOLVED BY THE PRESENT INVENTION

In order to sputter the permalloy thin film having a high permeability and a low coercive force, there have been known typically three techniques, one of which is discussed in J. Appl. Phys. Vo. 61, 4157 (1981) where the sputtering is performed in argon gas with a substrate held at a high temperature of 250° to 300° C. The second one is discussed in Thin Solid Films, Vo. 86, 165 (1981) where the sputtering is performed in argon gas with substrate being applied with a bias potential. The third one is discussed in IEEE Trans. Magnetics, MAG-20, 851 (1984) where the sputtering is performed using a mixture of argon and nitrogen. The third one, i.e., the process using the mixture of argon and nitrogen may be performed with the substrate being applied with a bias potential as described in the aforementioned reference, i.e., IEEE Trans. Magnetics, MAG-20, 851 (1984).

The first technique for forming the permalloy thin films having a high permeability and a low coercive force, that is, the process of sputtering in argon gas with a substrate held at a high temperature of 250° to 300° C. has a disadvantage of producing the permalloy thin film having a high internal stress caused by the high substrate temperature. The high internal stress enhances a stress-induced anisotropy which may cause a reduction of the reproducing output due to a slight compositional variation throughout the permalloy thin film and an instability of the reproducing output. The compositional variation of the permalloy thin film results from that of a sputtering target and a variation of sputtering output, so that practically useful sputtering conditions are limited in a narrow range. Moreover, the high substrate temperature of 250° to 300° C. makes it disadvantageously impossible to use photoresists having a low heat-resistance of 250° C. as expressed by a temperature up to which the photoresists are durable as isolating films for thin film magnetic heads.

The second technique for forming the permalloy thin films having a high permeability and a low coercive force, that is, the process of sputtering with a substrate being applied with a bias potential has disadvantages that an upper magnetic film of the thin film magnetic heads has a large compositional variation between a flat region and a sloped region and that even in the plane of the substrate the composition varies to a great extent resulting in a problem of the large instability of reproducing output. In the process of sputtering with the substrate being applied with a bias potential, both deposition of a film and removal of the film due to ions occur at the same time. As an ion beam incident angle is different between the flat region and the sloped region, the dependence of the sputtering yield upon the ion beam incident angle varies with a sort of elements and hence the composition of the flat region is different from that of the sloped region. Moreover, when there is a potential distribution in the plane of the substrate, the fact that the dependence of sputtering yield upon the potential varies with a sort of elements causes the variation of composition in the plane of the substrate.

The third technique for forming the permalloy thin films having a high permeability and a low coercive force by sputtering, that is, the process of sputtering using a mixture of argon and nitrogen is an effective one for producing the thin film magnetic heads, but no literature teaches anything about crystalline structure of the permalloy thin film and their magnetic properties. The permalloy thin film formed by the sputtering process is well known to vary in crystal properties such as crystalline grain, crystalline orientation and presence or absence of columnar crystals as well as in magnetic properties such as coercive force and the like depending upon the sputtering way and the sputtering conditions. J. Appl. Phys. 57, 3991 (1985) discusses about the crystal properties of the permalloy thin films formed by the sputtering process and described that the permalloy thin films sputtered in pure argon has an average grain size of 650 Å and those in a mixture of argon with an addition of 1% nitrogen has that of 250 Å indicating the growth of finer crystalline grains. It teaches also that the permalloy thin film sputtered in the mixture of argon and nitrogen has a higher orientation of (002). The higher orientation of (002) means that the (002) face of the face-centered cubic permalloy has been greatly grown as a face parallel to the underlying layer. J. Appl. Phys. 61, 3520 (1987) discusses about the crystal properties and the magnetic properties of the permalloy thin films formed by the sputtering process with ion beams and reports that the permalloy thin films sputtered in a mixture of argon and nitrogen consists of a mixture of crystalline grains having a smaller size than those found in the permalloy thin films formed by sputtering in pure argon and crystalline grains having a larger size which would be grown by sputtering in pure argon, an amount of columnar crystals is reduced and that the <111> orientation is also reduced. The <111> orientation means that the <111> direction of the face-centered cubic permalloy has greatly grown perpendicularly to the underlying layer in the same meaning as the (111) face being parallel to that layer. That is, it states that the permalloy thin films sputtered in the mixture of argon and nitrogen exhibits a reduced growth of the (111) face, i.e., the crystal face parallel to the underlying layer, but makes no mention about which crystal face has a more eminent orientation. This reference reports that the permalloy thin films sputtered in a mixture of argon and nitrogen has a lower coercive force.

J. Appl. Phys. 57, 3991 (1985) reports that the crystalline grain size of the permalloy thin film formed by sputtering in a mixture of argon and nitrogen is simply reduced, while J. Appl. Phys. 61, 3520 (1987) describes that the permalloy thin film sputtered in the mixture of argon and nitrogen consists of a mixture of crystalline grains having a smaller size and crystalline grains having a larger size than that of films grown by sputtering in pure argon. Such a difference in crystal growth of the permalloy thin films produced by sputtering in the mixture of argon and nitrogen may be attributed to differences in sputtering pressure, substrate temperature and the like.

SUMMARY OF THE INVENTION

It is an object of the present invention to provide a thin film magnetic head having a high permeability, low coercive force, smaller internal stress and an excellent uniformity of composition in the flat region and the sloped one as well as in the plane of the substrate which can be obtained without specifically limiting sputtering process and conditions.

The present invention lies in a thin film magnetic head having a substrate, a lower magnetic film on the substrate, a magnetic gap film, insulating films, a coil and an upper magnetic film, characterized in that said magnetic films are made of a substantial nickel-iron alloy thin film consisting substantially of a mixed structure of both face-centered cubic and body-centered tetragonal systems so that said magnetic films can have a reduced internal stress due to the sputtering with the substrate being at a lower temperature, an excellent uniformity of composition in the flat region and the sloped one as well as in the plane of the substrate.

The thin film magnetic head of the present invention is characterized in that at least one of said lower magnetic film and said upper magnetic film have a cryatal structure of body-centered tetragonal system and the {002} cryatal plane of said body-centered tetragonal system is oriented substantially parallel to the underlying plane of said magnetic film.

The thin film magnetic head of the present invention is characterized in that at least one of said lower magnetic film and said upper magnetic film comprises major components of nickel and iron and 0.1 to 1.0 at. % one or more elements selected from the group consisting of nitrogen, oxygen, carbon and boron.

Moreover, it is prefered that the magnetic film contains 80 to 85 at. % nickel and 15 to 20 at. % iron.

The thin film magnetic head of the present invention is characterized in that at least one of said lower magnetic film and said upper magnetic film have two crystal structures of two crystal structures of face-centered cubic system and body-centered tetragonal system and have an average grain size of 0.1 $\mu$m to 0.01 $\mu$m and a magnetostriction constant of $1 \times 10^{-6}$ absolute or less.

The thin film magnetic head of the present invention is characterized in that at least one of said lower magnetic film and said upper magnetic film comprises a multilayer magnetic film composed of alternatively laminated non-magnetic films and magnetic films and have two cryatal structures of face-centered cubic system and body-centered tetragonal system.

That is, the present invention provides the thin film magnetic head comprising a lower magnetic film formed on a substrate, an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film has a mixed structure of face-centered cubic system and body-centered tetragonal system.

The face-centered cubic system and the body-centered tetragonal system mean here crystal structures of the alloy forming the magnetic film.

The upper magnetic film and the lower magnetic film should preferably be composed of a nickel-iron alloy and formed by sputtering techniques. In addition, a content of body-centered tetragonal crystals should preferably be higher than that of face-centered cubic crystals.

The proportion of the face-centered cubic crystals and the body-centered tetragonal ones in the mixed structure may vary in a wide range from 1% face-centered cubic crystals to 99% body-centered tetragonal ones to 99% face-centered cubic crystals to 1% body-centered tetragonal ones. Preferably the face-centered cubic crystals should be 49% or less and the body-centered tetragonal ones 51% or more. More preferably, the former should be 25% or less and the latter 75% or more.

The thin film magnetic head of the present invention is characterized in that at least one of said lower magnetic film and said upper magnetic film comprises elements of Ni, Fe and X where X represents one or more elements selected from a group consisting of N, O, C and B and have a crystal structure of body-centered tetragonal system.

It is preferred that the non-magnetic films have metal elements, oxygen and nitrogen, said metal elements being one or more elements selected from a group consisting of Al, Si, Ti, V, Cr, Zr, Nb, Mo, Ta and W.

The thin film magnetic head of the present invention is characterized in that at least one of said lower magnetic film and said upper magnetic film comprises major components of nickel and iron and 0.05 to 2.0% nitrogen and have a mixed structure of both face-centered cubic system and body-centered tetragonal system.

It is preferred that the magnetic films as represented by the magnetic film of the thin film magnetic head are produced by sputtering a nickel alloy thin film containing 15 to 20 at. % iron and 0.1 to 1.0 at. % nitrogen and the balance of substantial nickel onto a non-magnetic substrate in a gaseous mixture of argon and 1 to 10 vol % nitrogen with a magnetic field being inversely applied parallel to the film plane of the thin film.

BRIEF DESCRIPTION OF THE DRAWINGS

FIG. 3 is a graph showing the coercive force of the film as a function of an amount of boron.

DESCRIPTION OF THE PREFERRED EMBODIMENTS

Figure 1:
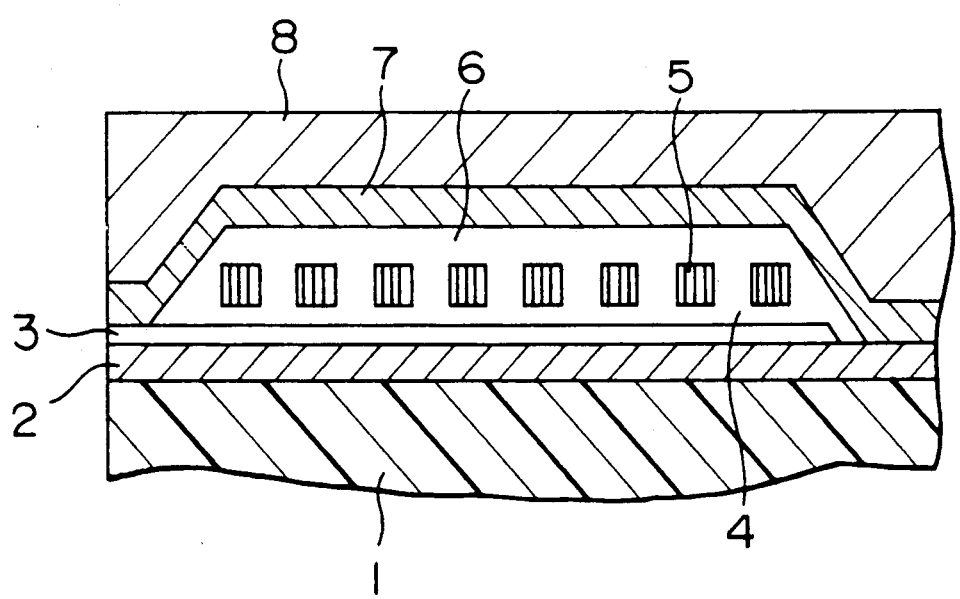
FIG. 1 is a cross-sectional view of one of embodiments of the thin film magnetic heads according to present invention.

Magnetic films made of a substantial nickel-iron alloy consisting of a mixed structure of both face-centered cubic and body-centered tetragonal systems where an amount of the face-centered cubic crystals is higher than that of the body-centered tetragonal ones can desirably exhibit a high permeability and low coercive force in a wide range of thickness even when the sputtering is performed with the substrate at a lower temperature. Magnetic films made of a substantial nickel-iron alloy consisting of a mixed structure of both face-centered cubic and body-centered tetragonal systems where the {002} crystal face of the body-centered tetragonal structure is oriented substantially parallel to the underlying layer can desirably achieve a high permeability and low coercive force under wide sputtering conditions.

Magnetic films comprising NiFeX where X represents one or more of elements selected from a group consisting of nitrogen, oxygen, carbon and boron, formed by the sputtering process are preferred since they have a high permeability and low coercive force and consists of substantially a mixed structure of face-centered cubic and body-centered tetragonal systems. Moreover, the magnetic films should preferably have an atomic composition expressed by the formula $Ni_l Fe_m X_n$ where l=80 to 85%, m=80 to 85%, n=0.1 to 1% and X represents one or more of elements selected from a group consisting of nitrogen, oxygen, carbon and boron, because they are superior in lower magnetic stress and thermal stability.

Magnetic films having an atomic composition of $Ni_{80\sim 85}Fe_{15\sim 20}N_{0.1\sim 1}$ and consisting of a mixture of face-centered cubic and body-centered tetragonal crystals can be produced by sputtering a target of a composition of $Ni_{80\sim 85}Fe_{15\sim 20}$ in a mixture of argon and 1 to 10% by volume. Therefore, the target can be made desirably by the same technique as the prior art.

Moreover, multilayer thin film magnetic heads where the magnetic films consisting of the mixture of face-centered cubic and body-centered tetragonal crystals and non-magnetic films are alternatively superimposed may be used as at least one of the upper magnetic film and the lower magnetic film, thereby resulting in a thin film magnetic head which is preferred in that it has a higher permeability and a lower magnetic loss in a high frequency range. Moreover, the non-magnetic films in the multilayer magnetic films may be insulating films containing a metal element M and nitrogen, whereby the non-magnetic films may be sputtered using oxides as a target and the same gaseous mixture of argon and nitrogen as those used in production of the magnetic films by sputtering. This facilitates the commercial production of the heads. The metal element M should be preferably one or more of elements selected from a group consisting of Al, Si, Ti, V, Cr, Zr, Nb, Mo, Ta and W in view of the densities of the films.

The bulk nickel-iron alloy is a typical material exhibiting a high permeability and low coercive force as discussed by Bozorth in Ferromagnetism (D. Van Nostrand Company, 1951). The nickel-iron alloy exhibiting a high permeability and low coercive force is generally called permalloy, the composition of which consists of 75 to 85% nickel and 15 to 25% iron. Permalloy has a crystal structure of face-centered cubic system. When permalloy is employed as the magnetic films of the thin film magnetic heads, it is produced by a plating process or a sputtering process as described above. The permalloy produced by the plating process or the sputtering process is called permalloy thin film, which has magnetic properties different from those of bulk permalloy in that the permalloy thin film has generally a higher internal stress and different crystal properties such as crystalline grain size compared with the bulk permalloy. In order to realize a permalloy thin film having a high permeability and low coercive force, a vertical magnetic anisotropy characteristic of magnetic films must be reduced.

The cause for generation of the vertical magnetic anisotropy in the permalloy thin films has been heretofore explained mostly by stress-induced anisotropy and microscopic form anisotropy. That is, when an internal stress $\sigma$ is acting in the film plane of the permalloy thin film, the product of $\sigma$ by $\lambda$ where $\lambda$ is a magnetostriction constant of the permalloy thin film is negative to generate the vertical magnetic anisotropy. The product $\lambda\sigma$ becomes negative when $\lambda$ is positive and $\sigma$ is negative, or when $\lambda$ is negative and $\sigma$ is positive, where the positive $\sigma$ means an internal tensile stress in the film plane, and the negative $\sigma$ means an internal compressive stress in the film plane. The value of the magnetostriction constant depends upon the composition and the orientation characteristics of the permalloy thin film.

The bulk permalloy has a sufficiently little internal stress and a sufficiently low stress-induced anisotropy owing to heat-treatment at a sufficiently high temperature of about 1000° C.

On the other hand, the permalloy thin film has a high internal stress and a large stress-induced anisotropy. This is one of the reasons for the fact that the permalloy thin film is significantly different in magnetic properties from the bulk permalloy.

Generally, there are two types of crystals grown in the films, one is granular and the other is columnar, depending upon film forming condition. The permalloy thin film has also granular crystals or columnar ones grown depending upon film forming condition. The columnar crystal is designated as a crystal having a higher length in the direction of the film thickness compared with a length in the film plane of a crystal grain, while the granular crystal is having almost the same length in the direction of the film thickness as that in the film plane. Fixing one's eyes upon one columnar crystal, the crystal is longer in the direction of the film thickness than in the film plane so that the film comprising the granular crystals will have a reduced diamagnetic field in the direction of the film thickness and a vertical anisotropy generated. On the other hand, the film comprising the granular crystals may have almost the same magnitude of diamagnetic field in the direction of the film thickness as that in the film plane so that no vertical anisotropy generates. Such an anisotropy as generated owing to the difference in crystalline form is called microscopic form anisotropy. The bulk permalloy comprises mostly granular crystals and has almost negligible microscopic form anisotropy. On the other hand, in the case of the permalloy thin film, the microscopic form anisotropy can not be negligible because of possible growth of the columnar crystals.

The fact that the magnetic properties of the permalloy thin films produced by a sputtering process vary with the way of sputtering and the sputtering conditions is attributed to that the vertical magnetic anisotropy varies with variations of the internal stress $\sigma$, crystal orientation, or crystalline form.

We have made an intensive research for crystalline structures and magnetic properties of the permalloy thin films. As a result, the third cause of the generation of the vertical magnetic anisotropy has been clarified and by removing this third cause, a permalloy thin film having a high permeability and low coercive force has been realized. The third cause of the generation of vertical magnetic anisotropy is the crystalline magnetic anisotropy of the face-centered cubic permalloy. The permalloy thin films to be used in the thin film magnetic heads comprise polycrystals which generally have a grain size in the range of 0.03 to 0.2 μm. From this fact, crystalline magnetic anisotropy has been regarded as an average of crystalline grain sizes and considered nigligible as a whole. Therefore, there has been heretofore little discussion about the relation between the crystalline magnetic anisotropy and the vertical magnetic anisotropy or the coercive force. Although IEEE Trans. on Magnetics. MAG-6, 619 (1970) discusses about nonuniformity of uniaxial magnetic anisotropy, i.e., about random anisotropy and crystalline magnetic anisotropy, there is no discussion about the relation between the crystalline magnetic anisotropy and the vertical magnetic anisotropy or coercive force.

The permalloy thin films to be used in the thin film magnetic heads are required to have a low magnetostriction constant. the permalloy thin films having a low magnetostriction constant should be consist of 80 to 85% nickel and 15 to 20% iron taking account of cases of different crystal orientations. The permalloy having a composition in this range has a negative crystalline magnetic anisotropy constant $K_1$. The materials having a negative crystalline magnetic anisotropy constant $K_1$ have a crystal direction $<111>$ as an axis prone to magnetization.

Therefore, even in the case of polycrystalline permalloy thin films, the vertical magnetic anisotropy due to the crystalline magnetic anisotropy is generated in a permalloy having a great deal of $<111>$ in the direction perpendicular to the film plane, i.e., a lot of $\{111\}$ layers parallel to the film plane. The vertical magnetic anisotropy results in a reduction of permeability and an increase of coercive force to be unsuitable to magnetic films for use in the thin film magnetic heads. On the other hand, the crystal structure of the permalloy in a state of equilibrium is of face-centered cubic system, the close-packed plane of which is $\{111\}$ plane. Therefore, the face-centered cubic permalloy thin films are apt to have a great deal of close-packed plane $\{111\}$ grown parallel to the film plane. Therefore, the conventional permalloy thin films have a disadvantage that the coercive force tends to be large owing to the crystalline magnetic anisotropy.

We have conducted detail X-ray diffraction analysis of crystal structures of the permalloy thin films and as a result found the existence of body-centered tetragonal crystals which are considered metastable and inexistent in a state of equilibrium and which are not discussed in Ferromagnetism, D. Van Nostrand Company, 1951 by Bozorth. Moreover, we have clarified that this body-centered tetragonal system has a close relation to the magnetic properties of the permalloy thin films. The body-centered tetragonal means a structure where three crystal axes are at right angle with one another, lattice constances a of two crystal axes are the same, an other lattice constant b is different from a and atoms are disposed at one center and eight corners.

The permalloy thin films comprising substantially a mixture of the face-centered cubic and the body-centered tetragonal structures exhibit a higher permeability and lower coercive force as compared with those comprising substantially the face-centered cubic structure alone.

Generally the magnetic films to be used in the thin film magnetic heads have a thickness of 10 μm or less, preferably in the range of 0.5 to 4 μm. It is important in this range of thickness for the permalloy thin films to have a high permeability and low coercive force. The permalloy thin films comprising a hiher amount of body-centered tetragonal crystals than that of face-centered cubic ones can exhibit a high permeability and low coercive force over a wide thickness range so that they are suitable for the thin film magnetic heads. The permalloy thin films comprising a mixture of body-centered tetragonal crystals and face-centered cubic ones should be preferably oriented to have the $\{002\}$ crystal plane of the body-centered tetragonal structure disposed substantially parallel to the underlying layer, more particularly, within an angle $\pm 10°$ as a highest proportion of existing body-centered tetragonal crystals so as to realize the high permeability and low coercive force properties even with a variation of sputtering condition.

As an amount of the body-centered tetragonal crystals increases, i.e., that of the face-centered cubic ones decreases, the ranges of film thickness and sputtering conditions that lead to the high permeability and low coercive force can be widened. This fact may be explained as follows. As described above, the face-centered cubic permalloy thin films having $\{111\}$ orientation exhibit the vertical magnetic anisotropy due to the crystalline magnetic anisotropy. The vertical magnetic anisotropy decreases as an amount of the face-centered cubic crystals. Though the crystalline magnetic anisotropy constant of the single body-centered tetragonal permalloy crystal is unknown, it is considered that the c axis of the crystal, to say the least, is not an axis prone to magnetization. Even when the body-centered tetragonal crystals have been grown with the {002} crystal plane being substantially parallel to the underlying layer, i.e., the c axis being substantially perpendicular to the film plane, the vertical magnetic anisotropy may not be generated depending upon the crystalline magnetic anisotropy of the body-centered tetragonal crystals. For these two reasons, the permalloy thin films containing the body-centered tetragonal crystals exhibit a higher permeability and lower coercive force over a wider range of film thichness and under less strict sputtering conditions. According to our experiments, moreover, even when a lot of columnar crystals exist, the existence of a gerat deal of the body-centered tetragonal crystals leads to the high permeability and low coercive force, while even when most existing crystals are granular, a large coercive force results unless a substantial amount of the body-centered tetragonal crystals exists. It can be considered from these results of the experiments that the crystalline magnetic anisotropy contributes more greatly to the vertical magnetic anisotropy than does the microscopic form anisotropy.

In order to produce the permalloy thin films containing a substantial amount of the body-centered tetragonal crystals which are possibly metastable phases, one or more of boron, carbon, nitrogen, oxygen and the like having a smaller atomic radius comparing with those of nickel and iron should be added. As techniques for producing the permalloy thin films, the sputtering process which is excellent in controlling the composition is most suitable and other dry processes such as vacuum deposition and ion implantation may be employed. Though the plating process can form the nickel-iron alloy thin films containing boron, the stability of the plating solution is insufficient for commercial production. The permalloy thin films containing one or more of boron, carbon, nitrgen and oxygen have a great deal of crystals grown with the {002} crystal plane of a smaller atomic density being parallel to the underlying layer. The great growth of the {002} crystal plane having a smaller atomic density parallel to the underlying layer may be attributed to easy introduction of small radius atoms such as boron, carbon, nitrogen and oxygen into the lattice as an interstitial type. The introduction of small radius atoms such as boron, carbon, nitrgen and oxygen into the interstitial sites cause an extension of the c axis which is the direction of the crystal growth and an reduction of the a axis to produce the body-centered tetragonal crystals. As an amount of the interstitial atoms in the lattice such as boron, carbon, nitrgen and oxygen increases, a proportion of the body-centered tetragonal crystals in the resulting films increases. When the composition of the permalloy thin films is expressed as an atomic ratio by the formula $Ni_lFe_mX_n$ where X represents one or more selected from a group consisting of boron, carbon, nitrgen and oxygen, it is necessary for achieving a small magnetostriction constant that $l=80$ to $85\%$ and $m=15$ to $20\%$. The per cent of X atom, n should suitably be 0.1 to 1%. If it is lower than 0.1%, the resulting permalloy thin films comprises substantially face-centered cubic crystals, which is unable to achieve the high permeability and low coercive force in the wide range of thickness and under less restrictive sputtering condition. If the permalloy thin films contain more than 1% of one or more from boron, carbon, nitrogen and oxygen, it is undesirably inferior in the thermal stability of magnetic properties such as coercive force.

Moreover, it can be safely said that macroscopically the face-centered cubic crystals and the body-centered tetragonal ones are inculuded uniformly throughout the film.

The present invention will be further explained in the following Examples with reference to FIGURES.

EXAMPLE 1

Referring to FIG. 1, a permalloy thin film containing nitrogen of a 1.2 μm thickness was formed as lower magnetic film on sufficiently ground and washed ceramic substrate 1 by a sputtering process with high frequency magnetron. In this case, the permalloy film has a composition comprising 82.35 at. % nickel, 0.42 at. % nitrogen, 0.20 at. % oxygen and the balance of iron and incidental impurities according to the present invention. This film had as magnetic properties a saturation magnetic flux density of 1.0 tesla, coercive force of 0.5 Oe, permeability of 2000 at 1 MHz and magnetostriction constant of $-0.5 \times 10^{-6}$. The sputtering was performed in a gaseous mixture of Ar and 8 vol. % $N_2$ at a gaseous pressure of 0.2 millitorr at a high frequency output of 2.7 W/cm$^2$ with the substrate at room temperature. In order to provide the uniaxial magnetic anisotropy in the film plane, a magnetic field of 50 Oe was applied parallel to the film plane during sputtering.

After sputtering, the lower magnetic film was patterned in a predetermined configuration by a ion milling process. Then, magnetic gap film 3 was sputtered and patterned by the ion milling process. Insulating film 4 consisting of positive photoresist was then applied, exposed to a pattern of light, developed and heat-treated to form a predetermined pattern. Then, coils 5 consisting of copper were applied in a patterned configuration by a flame plating process. Insulating film 6 was applied in a predetermined configuration for insulating coils 5 and upper magnetic film 7. Insulating film 6 was formed with the same material by the same process as in the case of insulating film 7. Then, upper magnetic film 7 of a thickness of 1.9 μm was formed in the same sputtering conditions as in lower magnetic film 2 except that a different sputtering time was employed. The upper magnetic film had a composition comprising 82.45 at. % nickel, 0.20 at. % nitrogen, 0.12 at. % oxygen and the balance of iron and incidental impurities. This film had a saturation magnetic flux density of 1.0 tesla, coercive force of 0.4 Oe, permeability of 2100 at 1 MHz and magnetostriction constant of $-0.5 \times 10^{-6}$. After sputtering the upper magnetic film, the film was patterned in a predetermined configuration by the ion milling process. Then, terminals which are not indicated in FIG. 1 were formed by a combination of sputtering, plating, ion milling and chemical etching processes, and thereafter, protective film 8 of aluminum was formed by the sputtering process. Then, the whole was mechanically processed to produce a predetermined thin film magnetic head. X-ray diffraction analysis of the crystalline structures of the lower magnetic film and the upper magnetic film indicates the followings: the lower magnetic film has a composition of 3% face-centered cubic crystals and 97% body-centered tetragonal crystals, a major proportion of the {002} planes of the body-centered tetragonal crystals being tilted only at 1.5° relative to a plane parallel to the underlying layer; the upper magnetic film has a composition of 1% face-centered cubic crystals and 99% body-centered tetragonal crystals, a major proportion of the {002} planes of the body-centered tetragonal crystals being tilted only at 0.7° relative to a plane parallel to the underlying layer. The proportion of the face-centered cubic crystals and the body-centered tetragonal ones could be easily determined according to the method with experimentally obtained X-ray diffraction intensities, structure factors, multiplet factors, Lorentz factors, temperature factors as described in Cality, "Introduction to X-ray diffraction" (translated by MATSUMURA into Japanese, Agune Co. 1951). The major proportion of {002} crystal planes can be easily determined by X-ray diffraction method with scintillation counter being fixed at an angle facing to {002} diffraction beam and with samples being rotaed. The proportion of the body-centered tetragonal crystals and the tilting angle of the {002} crystal plane relative to the underlying layer become not always the same with those obtained in this Example even by repeating the sputtering under the same conditions as described in this Example. That is, it should be noted that the proportion of the existing body-centered tetragonal crystals and the like depends significantly upon potential of cathodic electrode, plasma potential, relative location of introducing gases to an evacuating system, remaining gaseous pressure and types of the remaining gases.

Comparing with the thin film magnetic head according to the present invention, the lower magnetic film and the upper magnetic film were produced by prior art and other elements were made in the same manner as the present invention so as to provide a thin film magnetic head. The recording and reproducing properties of the contrast were compared with those of the head according to the present invention. The lower magnetic film and the upper one of the contrast head were made by the following method and had magnetic properties as described hereafter.

The lower magnetic film has a thickness of 1.2 $\mu$m and was formed by sputtering in Ar gas containing no $N_2$ at a gaseous pressure of 0.2 millitorr at a high frequency output density of 2.7 $W/cm^2$ with the substrate at room temperature. The film had a composition comprising 82.30 at. % nickel, 0.05 at. % oxygen and the balance of iron and incidental impurities and a saturation magnetic flux density of 1.0 tesla, coercive force of 5.0 Oe, permeability of 300 at 1 MHz and magnetostriction constant of $-0.7 \times 10^{-6}$ and 99% face-centered cubic crystals and 1% body-centered tetragonal ones. The upper magnetic film had a thickness of 1.9 $\mu$m and was formed by sputtering in Ar gas containing no $N_2$ at a gaseous pressure of 0.2 millitorr at a high frequency output density of 2.7 $W/cm^2$ with the substrate at room temperature. The upper magnetic film had a composition comprising 82.50 at. % nickel, 0.03 at. % oxygen and the balance of iron and incidental impurities. This film had a saturation magnetic flux density of 1.0 tesla, coercive force of 7.5 Oe, permeability of 250 at 1 MHz and magnetostriction constant of $-0.7 \times 10^{-6}$ and 99% face-centered cubic crystals and 1% body-centered tetragonal ones. That is, both the lower magnetic film and the upper magnetic film were composed substantially of face-centered cubic crystals and magnetic films having a higher coercive force and lower permeability.

A composite of the thin film magnetic head of the present invention and a recording medium applied with iron oxides magnetic powder was compared with that using the prior thin film magnetic head for recording and reproducing properties. No difference was observed between those two thin film magnetic heads in recording properties as represented by the repetitive writing property. However, the thin film magnetic head of the present invention exhibits 50% higher reproducing property than that of prior art and therefore, is suitable for use in the high recording density magnetic heads.

EXAMPLE 2

Thin film magnetic heads were made in the same manner as in Example 1 except that the conditions for forming the lower magnetic film and the upper magnetic film, magnetic properties, compositions, crystal structures and thickness of the films were different from those in Example 1 of the present invention.

The lower magnetic film has a thickness of 2.0 $\mu$m and was formed by sputtering in a gaseous mixture of Ar and 1 vol. % $O_2$ at a gaseous pressure of 0.17 millitorr at a high frequency output density of 1.5 $W/cm^2$ with the substrate at a temperature of 100° C. The film had a composition comprising 82.33 at. % nickel, 0.60 at. % oxygen and the balance of iron and incidental impurities and a saturation magnetic flux density of 1.0 tesla, coercive force of 0.5 Oe, permeability of 2000 at 1 MHz and 90% face-centered cubic crystals and 10% body-centered tetragonal ones. The upper magnetic film had a thickness of 2.6 $\mu$m and was formed by sputtering in a gaseous mixture of Ar and 0.5 vol. % $O_2$ at a gaseous pressure of 0.17 millitorr at a high frequency output density of 1.5 $W/cm^2$ with the substrate at a temperature of 100° C. The upper magnetic film had a composition comprising 82.55 at. % nickel, 0.24 at. % oxygen and the balance of iron and incidental impurities. This film had a saturation magnetic flux density of 1.0 tesla, coercive force of 0.35 Oe, permeability of 1900 at 1 MHz and 20% face-centered cubic crystals and 80% body-centered tetragonal ones. A composite of the thin film magnetic head of the present invention and a Co-Ni-Zr medium made by a sputtering process was measured for recording and reproducing properties, For comparison, the upper magnetic film and the upper magnetic film were produced by prior art using Ar gas and employed to make a thin film magnetic head. The prior art thin film magnetic head was composed of the same components in the samd configuration as those of the thin film magnetic head according to the present invention excet that the lower magnetic film and the upper magnetic film were formed in a different sputtering gas and that a proportion of face-centered cubic crystals and the composition were different from those according to the present invention. Comparing those two thin film magnetic heads with each other for recording and reproducing properties, the thin film magnetic head of the present invention exhibits 40% higher reproducing property than that of prior art and therefore, is suitable for use in the high recording density thin film magnetic heads.

EXAMPLE 3

Thin film magnetic heads were made in the same manner as in Example 1 except that the conditions for forming the lower magnetic film and the upper magnetic film, magnetic properties, compositions, crystal structures and thickness of the films were different from those in Example 1 of the present invention. The lower magnetic film has a thickness of 1.2 $\mu$m and was formed by sputtering in Ar gas containing no $N_2$ at a gaseous pressure of 0.24 millitorr at a high frequency output density of 1.5 W/cm² with the substrate at a temperature of 275° C. The film had a composition comprising 82.50 at. % nickel, 0.07 at. % oxygen and the balance of iron and incidental impurities and a saturation magnetic flux density of 1.0 tesla, coercive force of 0.6 Oe, permeability of 1800 at 1 MHz and 97% face-centered cubic crystals and 3% body-centered tetragonal ones. Therefore, it is the permalloy thin film comprising substantially the face-centered cubic crystals. The upper magnetic film had a thickness of 1.9 μm and was formed by sputtering a permalloy target containing 1 at. % carbon in a sputtering gas of Ar at a gaseous pressure of 0.25 millitorr at a high frequency output density of 2.7 W/cm² with the substrate at a temperature of 100° C. The upper magnetic film had a composition comprising 81.05 at. % nickel, 0.33 at. % carbon and the balance of iron and incidental impurities. This film had a saturation magnetic flux density of 1.1 tesla, coercive force of 0.4 Oe, permeability of 2200 at 1 MHz and 11% face-centered cubic crystals and 99% body-centered tetragonal ones. Thus it is a magnetic film mostly comprising body-centered tetragonal crystals. This thin film magnetic head of the present invention did not exhibit any deterioration of magnetic properties such as an increase of coercive force due to thermal history as high as 200° C. during producing the thin film magnetic head, nor raise any problem about thermal stability of magnetic properties.

A composite of the thin film magnetic head of the present invention and a recording medium applied with iron oxides magnetic powder was measured for recording and reproducing properties. The thin film magnetic head of the present invention was compared with thin film magnetic head produced by prior art as described in Example 1 for recording and reproducing properties. The thin film magnetic head of the present invention exhibits a 30% lower recording current and 55% higher reproducing output than those of prior art and therefore, is superior in both recording and reproducing properties.

EXAMPLE 4

Figure 2:
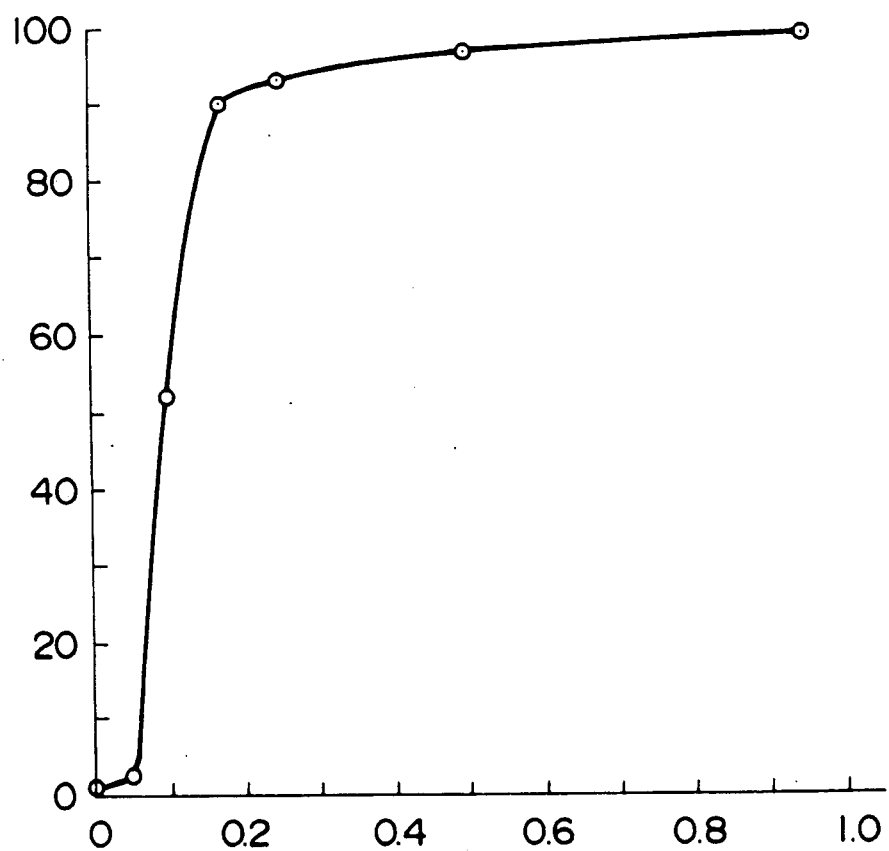
FIG. 2 is a graph showing a proportion of body-centered tetragonal crystals (P) as a function of an amount of boron.

Magnetic films of a thickness of 3 μm with varying boron content were produced by changing a boron content of the magnetic target and measured for the composition, crystal structure and magnetic properties. The sputtering was performed in Ar gas at a gaseous pressure of 0.3 millitorr at a high frequency output density of 1.3 W/cm² with the substrate at a temperature of 80° C. The films were analyzed for nickel, iron and boron and the results were expressed by the atomic formular $(Ni_{0.8260}Fe_{0.1740})_{100-x}B_x$. FIG. 2 is a plot of a proportion of body-centered tetragonal crystals versus $x$. FIG. 3 ia a plot of coercive force Hc versus $x$. It can be seen from FIG. 2 that as the boron content increases, the content of the body-centered tetragonal crystals increases. It can be seen from FIG. 3 that as the boron content increases, the coercive force decreases. That is, it is evident from FIGS. 2 and 3 that as body-centered tetragonal crystals increases, the films havd a lower coercive force.

It is apparent from FIG. 3 that the films having a coercive force of 1 Oe have a higher permeability and the thin film magnetic heads with such magnetic films are excellent in recording and reproducing properties.

Examples as described above disclose only a part of a number of experiments which we have conducted. It is evident that by making at least one of the lower magnetic film and the upper magnetic film, preferably both of them multilayer magnetic films, the present invention can advantageously provide such thin film magnetic heads as having an increased high frequency permeability, lower high frequency magnetic loss, no instability of reproducing output waveform and excellent recording and reproducing properties. Moreover, as metal elements composing the permalloy thin films, nickel and iron were illustrated, but it is evident that the same effects could be expected for the permalloy thin films added with one or more from palladium, rhodium, platinum, iridium, osmium, ruthenium and the like for the purpose of improving corrosion resistance. Additionally, it is evident that the same effects could be expected for the permalloy thin films added with one or more from copper, molybdenum, chromium, vanadium, and the like for the purpose of reducing coercive force and anisotropy magnetic field.

Furthermore, though Examples as described above discloses only high frequency sputtering processes, DC sputtering processes or ion beam sputtering processes may be employed. The important thing is that magnetic films formed by any other process than sputtering contain substantially body-centered tetragonal crystals.

What is claimed is:

1. A thin film magnetic head comprising
   a lower magnetic film formed on a substrate,
   an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit,
   conductive films forming a coil having a predetermined winding number, passing between said lower magnetic film and said upper magnetic film and crossing said magnetic circuit, and
   insulating films electrically insulating between said conductive films, between said conductive film and said lower magnetic film and between said conductive film and said upper magnetic film,
   characterized in that at least one of said lower magnetic film and said upper magnetic film has a mixed crystal structure of face-centered cubic crystals and body-centered tetragonal crystals.

2. The thin film magnetic head as defined in claim 1 where an amount of said face-centered cubic crystals is higher than that of said body-centered tetragonal crystals.

3. A thin film magnetic head comprising
   a lower magnetic film formed on a substrate and composed substantially of a nickel-iron alloy,
   an upper magnetic film composed substantially of nickel-iron alloy and formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit,
   conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film has a mixed crystal structure of face-centered cubic crystals and body-centered tetragonal crystals.

4. A thin film magnetic head comprising a lower magnetic film formed on a substrate, an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film comprises an atomic composition of Ni, Fe and X where X represents one or more elements selected from a group consisting of N, O, C and B and has a mixed crystal structure of face-centered cubic crystals and body-centered tetragonal crystals.

5. A thin film magnetic head comprising a lower magnetic film formed on a substrate, an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film has a crystal structure of body-centered tetragonal crystals and the {002} crystal plane of said body-centered tetragonal crystals is oriented substantially parallel to the underlying plane of said magnetic film.

6. A thin film magnetic head comprising a lower magnetic film formed on a substrate by a sputtering process, an upper magnetic film formed on said lower magnetic film by sputtering process, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film has a mixed crystal structure of face-centered cubic crystals and body-centered tetragonal crystals.

7. A thin film magnetic head comprising a lower magnetic film formed on a substrate, an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film comprises major components of nickel and iron and 0.1 to 1.0 at. % one or more elements selected from the group consisting of nitrogen, oxygen, carbon and boron, and has a mixed crystal structure of face-centered cubic crystals and body-centered tetragonal crystals.

8. The thin film magnetic head as defined in claim 7 where said magnetic film consists essentially of 80 to 85 at. % nickel and 15 to 20 at. % iron and 0.1 to 1.0 at. % one or more elements selected from the group consisting of nitrgen, oxygen, carbon and boron.

9. The thin film magnetic head according to claim 7 wherein said magnetic film is produced by sputtering a nickel alloy thin film containing 80 to 85 at. % nickel, 15 to 20 at. % iron and 0.1 to 1.0 at. % nitrogen onto a non-magnetic substrate in an argon-nitrogen gaseous mixture containing 1 to 10 vol. % nitrogen with a magnetic field applied reversingly in the direction parallel to the film plane of said thin film.

10. A thin film magnetic head comprising a lower magnetic film formed on a substrate, an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film has a mixed crystal structure of two crystal structures of face-centered cubic crystals and body-centered tetragonal crystals and has an average grain size of 0.1 to 0.01 μm and a magnetostriction constant of $1 \times 10^{-6}$ absolute or less.

11. A thin film magnetic head comprising a lower magnetic film formed on a substrate, an upper magnetic film formed on said lower magnetic film, one end of said upper magnetic film contacting with one end of said lower magnetic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film comprises a multilayer magnetic film composed of alternatively laminated non-magnetic films and magnetic films and has two crystal structures of face-centered cubic crystals and body-centered tetragonal crystals.

12. The thin film magnetic head as defined in claim 11 where said non-magnetic films have metal elements, oxygen and nitrogen, said metal elements being one or more elements selected from a group consisting of Al, Si, Ti, V, Cr, Zr, Nb, Mo, Ta and W.

13. A thin film magnetic head comprising a lower magnetic film formed on a substrate an upper magnetic film formed on said lower magnetic film, one end of said upper magnetic film contacting with one end of said lower magnectic film and the other end of said upper magnetic film being disposed on a magnetic gap on the side thereof opposite to the other end of said lower magnetic film with said magnetic gap disposed between two said other ends to form a magnetic circuit, conductive films forming a coil having a predetermined winding number, passing between said lower magnetic film and said upper magnetic film and crossing said magnetic circuit, and insulating films electrically insulating between said conductive films, between said conductive film and said lower magnetic film and between said conductive film and said upper magnetic film, characterized in that at least one of said lower magnetic film and said upper magnetic film comprises major components of nickel and iron and 0.05 to 2.0% nitrogen and has two crystal structures of face-centered cubic crystals and body-centered tetragonal crystals.

* * * * *